United States Patent [19]

Hedges

[11] Patent Number: 4,636,702

[45] Date of Patent: Jan. 13, 1987

[54] ENERGY ECONOMIZER CONTROLLED-CURRENT START AND PROTECTION FOR INDUCTION MOTORS

[75] Inventor: Rhey W. Hedges, Fort Lauderdale, Fla.

[73] Assignee: Louis W. Parker, Fort Lauderdale, Fla.

[21] Appl. No.: 639,098

[22] Filed: Aug. 9, 1984

[51] Int. Cl.$^4$ .............................................. H02P 5/40
[52] U.S. Cl. .................................. 318/729; 318/812; 318/778; 318/798
[58] Field of Search ............... 318/729, 798, 812, 778, 318/806; 361/24

[56] References Cited

U.S. PATENT DOCUMENTS

| | | | |
|---|---|---|---|
| 3,652,924 | 3/1972 | Dieterich et al. | 318/807 |
| 3,800,198 | 3/1974 | Graf et al. | 318/806 |
| 4,007,401 | 2/1977 | Kimmel et al. | 361/98 |
| 4,297,628 | 10/1981 | Hedges | 318/798 |
| 4,319,298 | 3/1982 | Davis et al. | 361/24 |
| 4,333,046 | 6/1982 | Lee | 318/729 |
| 4,355,274 | 10/1982 | Bourbeau | 318/729 |
| 4,361,793 | 11/1982 | Nordell | 318/729 |
| 4,384,243 | 5/1983 | Muskovac | 318/729 |
| 4,468,603 | 8/1984 | Vander Meer et al. | 318/729 |

*Primary Examiner*—David Smith, Jr.
*Attorney, Agent, or Firm*—Pollock, VandeSande and Priddy

[57] ABSTRACT

A standard, unmodified induction motor starts with reduced input current, energy consumption and mechanical stress and is further protected from AC power source "phase loss", excessively low or high voltage or a locked-rotor condition during start-up or any subsequent moment while running when its stator winding is energized from a sine wave source through a signal-responsive wave modifier operative to control the portion of each cycle of the sine wave which is coupled from said source to the stator winding. A stator current sampling arrangement, and a motor current demodulator responsive to the first few hundred microseconds of stator winding initial inrush current each time said current increases from zero cooperate under certain conditions to produce signals for an associated wave modifier, thereby to achieve a preferred magnitude of motor starting current under rated load conditions and achieve near-optimum motor operating efficiency during start-up and subsequent running with reduced loads and associated motor protection circuits which inhibit said wave modifier thereby to de-energize said stator winding under locked-rotor conditions that occur when motor start-up is attempted or later when the motor is running, or an AC power source anomaly occurs which would otherwise cause start-up stalling, excessive motor running current or motor stalling under rated loads.

10 Claims, 9 Drawing Figures

ENERGY ECONOMIZER CONTROLLED-CURRENT START AND PROTECTION FOR INDUCTION MOTORS

BACKGROUND OF THE INVENTION

Various prior art means have been devised to reduce current surges associated with full-voltage starting of induction motors. Typically, a reduced stator voltage is first applied, then gradually increased in a series of manual steps or caused to rise automatically from said initially reduced voltage to full-rated voltage during a preferred time period, i.e., in the form of a "voltage increase vs. time ramp". U.S. Pat. No. 4,404,511, entitled "Motor Power Factor Controller With A Reduced Voltage Starter" is an example of a "voltage ramp-type" motor starter that also includes reduced-load power savings means that becomes operative after a manual, i.e., arbitrarily selected, start-up time period during which full power line voltage is ultimately applied to the stator windings (regardless of actual start-up requirement). As is common practice of the general prior art with reduced-voltage motor start means, said patent neither incorporates nor anticipates protection against power source anomalies or overcurrent protection of the stator winding from locked-rotor events during motor start-up (or later).

U.S. Pat. No. 4,086,406 entitled "Chilled Controls" is an example of another arbitrarily-timed "ramp-type" reduced voltage motor starter that includes means for stator overcurrent protection and AC power source anomalies, but does not incorporate means to later improve motor operating efficiency by adjusting input voltage as a function of load demand. Said motor protection functions are very complex and based upon wholly different concepts and circuit implementation means than the present invention.

Taken together, the above cited art is representative of the fundamental concepts and practices employed by the general prior art for electronic motor start control and stator overcurrent protection means. In the instance of motor start control, said prior art may be characterized as slowly increasing the magnitude of stator input voltage from a reduced level to full power line voltage as a function of time passage, wherein said time factor is arbitrarily selectable or comprises a preferred time duration predetermined by design, but, in any event, is not controllingly responsive to individual electro-mechanical characteristics of the motor actually being controlled and its actual load of a moment. In the instance of stator overcurrent protection, the prior art may be characterized as being controllingly responsive to alternation current peaks—or the average—of RMS current flow into the stator winding and/or temperature rise therein for a predetermined or manually selected time period. Prior art power source protection for power source anomalies typically rely upon a multiplicity of electronic comparators and complicated circuit arrangements.

Arbitrarily timed "stator voltage ramp-type" start control means often result in unreliable starting, motor system instability, unnecessary power waste and motor heating during excessively slow acceleration, and/or significant vibration during some portion of the motor start-up period. Likewise, they routinely permit the flow of excessive stator current and waste substantial electric power since (typically reduced) start-up motor loads seldom require the full AC power source voltage which is ultimately coupled at the termination of their reduced-voltage motor start-up time period. Effective—but nuisance free—operation of stator RMS current overprotection means that respond to alternation peaks above a particular threshold is seldom realized with electronically-reduced voltage starter means due to alternation crest factors and power source, phase-related transient stator inrush currents associated with switched-partial sine waves produced thereby.

In my prior U.S. Pat. No. 4,297,628, entitled "Energy Economizer for Induction Motors", there is disclosed AC power saving means which utilizes certain characteristics of stator inrush current related by natural motor properties to rotor mechanical load magnitude and the efficiency with which electric energy is converted into mechanical energy thereby to cause an induction motor to operate with minimum input power from zero to maximum rated load. This prior U.S. patent (4,297,628) describes stator current demodulating means for an energy saving stator power control system employing wave modifier means suitable for single phase induction motors. Said prior patent also references my U.S. Pat. No. 4,242,625 entitled "Energy Economizer for Polyphase Induction Motors" which discloses an arrangement of the same general type employing two wave modifiers which may be responsive to motor load detection means of the current demodulator-type thereby to provide load/efficiency-related control of AC power input to a three phase motor.

The object of my aforementioned prior inventions was to provide AC power control means responsive to an induction motor's natural load/efficiency-related characteristics thereby to enable said characteristics to maintain near-optimum motor efficiency from zero to maximum rated mechanical load with low, nominal or high power source voltage by varying stator input power in proportion to workload requirement. Those prior inventions do not provide motor start-up energy-saving, start-current surge reduction, protection against power source anomalies, or overcurrent protection for the stator winding(s) from a locked-rotor event during or after motor start-up. However, it is known that when full power line voltage is applied to start a motor, stator current surges from five to eight times normal operating current subject the motor to severe electromechanical stress, is wasteful of electrical power even when a motor is free to start normally, and will quickly cause permanent stator winding damage if the motor driven mechanism jams during start-up or stops rotation any time thereafter. It is also known that thermally-activated circuit breakers typically prevent catastrophic, immediate motor failure, but allow some degree of permanent winding damage which shortens a motor's useful life when a locked-rotor event or power source anomaly occurs.

The present invention comprises significant improvement in the art of induction motor starting and includes means for 3∅ motor protection from excessively high or low power source voltage, phase loss, and severe overload, including locked-rotor events, which occur during or subsequent to motor start-up. While the present invention relates generally to the field of power input controls for induction motors, it specifically relates to a motor current demodulating-type power saving controller and further provides controlled current starting by reduction of input voltage and stator winding protection from start-up phase loss and/or prolonged operation with input current substantially greater than rated full-load magnitude due to locked-rotor conditions or power source anomalies.

The present invention avoids various difficulties, limitations, energy waste, and nuisance aspects of prior art induction motor start and protection means by practical application of the fundamentally new concepts concerning stator input power control and novel circuit means for monitoring performance-related stator initial inrush current characteristics first disclosed in my U.S. Pat. No. 4,297,628. As will be described later, stator power control relies upon processing and control use of short-duration (microseconds) voltage pulses whose characteristics are related by natural motor properties to rotor speed (slip), motor load, power conversion efficiency and stator current peak amplitude during each power source alternation.

SUMMARY OF THE INVENTION

A standard AC induction motor has its stator energized from a sine wave power source through one wave modifier or two wave modifiers, in the instance of a three phase motor, operative to vary the portion of each cycle of said sine wave which is coupled from the power source to the stator winding(s). Said wave modifier(s) may be of the type discussed in Hedges' U.S. Pat. No. 4,242,625 or as in the energy economizer technology integrated circuit (EET-IC) which implements the invention embodiments described herein. In accordance with the present invention, said wave modifier(s) is (are) responsive to added circuit means, manual adjustments and electric signals developed by monitoring stator initial inrush current characteristics which communicate the state of the motor (i.e., energized or de-energized). Said added circuit means cooperate with an energy economizer-type stator current monitoring means and said EET-IC thereby to provide an induction motor power control system with two energy-saving "operating modes" and two "protection modes".

The two operating modes are: motor start-up and motor run. Each operating mode has an associated protection mode adapted to prevent stator winding damage by response to potentially damaging conditions during motor start-up and/or later running. More specifically, during a motor start-up mode, the energy-saving control circuit portion of the stator current demodulator means within the EET-IC is inhibited and phase-angle-delayed coupling of partial source voltage alternations produces an RMS stator voltage magnitude subject to manual selection of a preferred maximum RMS starting current. Assuming the rotor shaft is free to commence rotation, the motor starts to accelerate at said preferred (reduced) voltage and controlled current magnitude. Circuit means responsive to stator current characteristics related by natural motor properties to rotor speed maintain the present invention control system in said start mode until said characteristics indicate the motor has accelerated to near synchronous speed whereat, in response to said speed indication, said circuit means shifts said control system to a run mode wherein stator voltage magnitude is controlled by rotor load demand of a moment. Thus, in accordance with the teaching of the present invention, time duration of a motor start-up mode and the voltage magnitude coupled to the stator are subject to the reality of prevailing conditions rather than an arbitrarily selected time duration imposed by artificial means that ultimately applies full power line voltage regardless of actual motor load demand. More particularly, when the rotor is free to rotate, the present invention start-up mode time duration and applied stator voltage magnitude is primarily determined by:

1. An operator-preferred start-current magnitude
2. Prevailing mechanical aspects of the motor-driven mechanism
3. Electro-mechanical characteristics peculiar to the controlled motor, and
4. The actual motor workload requirement when the motor reaches near-synchronous speed.

However, in the event the rotor shaft is jammed (a locked-rotor condition) and cannot start rotation or continue rotating while in the start-up mode, the present invention "start mode protection" means, after a manually selected time delay, will terminate an in-process "motor start-up mode" by inhibiting said wave modifier(s). The control system will remain in an "AC power inhibit mode" until the main (power source) switch is turned off. When AC power is re-applied, a new "start-up mode" will be activated. Thus, even if the motor is starting with controlled input current limited to approximately full-load rating, the "start-up mode" will automatically shift to an "AC power inhibit mode" at the conclusion of a previously selected period if the motor cannot accelerate normally. In other words, in accordance with the present invention, failure of a motor to accelerate to a near-synchronous speed with full-load or higher current in a particular time period is recognized as a potentially damaging condition and sufficient cause to inhibit AC input power even if the stator winding(s) has (have) not yet been subjected to overheating by excessive current flow.

After rotor start-up is achieved, and said control system has shifted to a "run-mode", "run mode protection" means is enabled but remains inactive while stator input power is matched to load demand by stator current demodulating-type means of the aforementioned prior Hedges' invention. During rated load-range operation, therefore, near-optimum motor operating efficiency is maintained. However, in the instance of a locked-rotor event, said "run mode protection" means will nearly instantly terminate the previous "run mode" by inhibiting said wave modifier(s) and assume an "AC power inhibit mode" until the main (power source) switch is turned off. When the main switch is re-energized, said control will assume a controlled-current "start-up mode". If the locked-rotor condition prevails, the "start-up mode" will terminate as previously described; if the rotor is free to rotate, said control system will automatically shift to its energy-saving "run mode" when the rotor has accelerated to near-synchronous speed.

3∅ power source input voltage and current to the present invention is monitored for potentially damaging amplitude variations or phase loss. If an input power line becomes "open-circuited" (i.e., "phase loss"), stator power is inhibited within one power source cycle. Stator input power is also inhibited if source voltage rises or falls substantially, e.g., in excess of plus twenty or minus sixty-five percent of nominal rating.

As described below, the present invention comprises means for induction motor start control and stator winding protection that is wholly different from the known prior art in fundamental concept, practice and implementation means.

DESCRIPTION OF THE PREFERRED EMBODIMENTS

To assist understanding the present invention, the basis for development of load-proportional power control signals from natural characteristics of current flow between a sine wave AC power source and an induction motor stator will first be discussed.

Figure 7A:
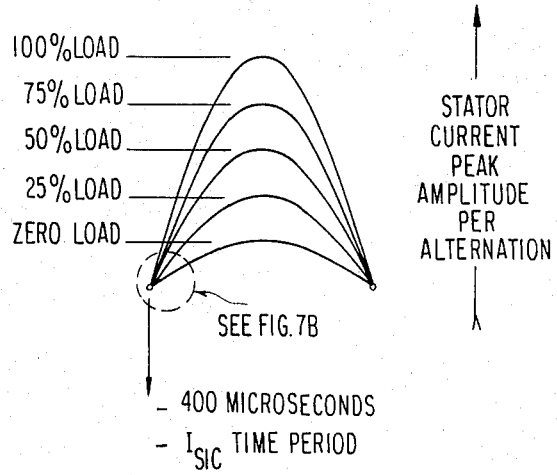
FIGS. 7A and 7B illustrate the load/efficiency-related characteristics of stator inrush current.
Figure 7B:
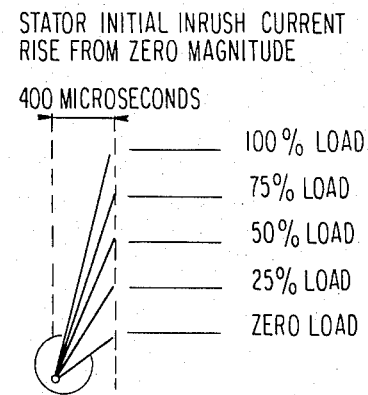

Particular load/efficiency-related characteristics are illustrated by FIGS. 7A and 7B. For descriptive purposes, current rise from zero magnitude (FIG. 7A dotted circle) is designated "stator inrush current" (abbreviated "$I_{sic}$") and the $I_{sic}$ time period is specified as approximately four hundred microseconds (FIG. 7B).

Figure 6:
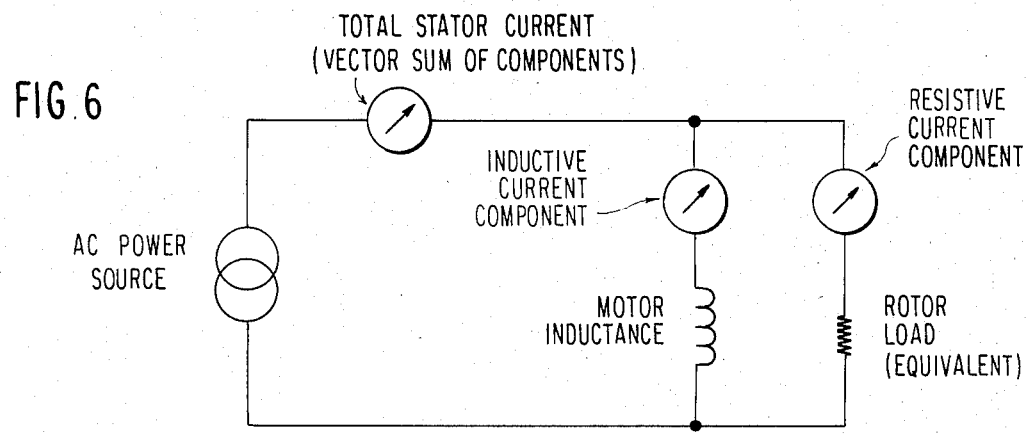
FIG. 6 is a simplified equivalent circuit of an induction motor.

FIG. 6 is a simplified equivalent circuit for an induction motor, and shows that stator current magnitude at every moment is the vector sum of inductive and resistive components resulting from motor inductance and rotor mechanical load respectively. These current components exhibit particular characteristics during the $I_{sic}$ time period identified in FIG. 7A. Said characteristics are dicated by laws which govern electric current flow and the natural properties of induction motors.

FIG. 7A depicts stator current alternations at various rotor loads, and shows that stator current magnitude during each alternation becomes proportional to rotor-load demand when stator input voltage is adjusted for highest motor efficiency, i.e., it increases when load increases, said vice-versa. Examining events within the dotted circle of FIG. 7A reveals that $I_{sic}$ risetime and magnitude are a function of a stator current peak amplitude which occurs at a later time; the $I_{sic}$ events are more clearly seen in FIG. 7B, which is an enlarged view of the dotted circle portion of FIG. 7A.

During the $I_{sic}$ time period, stator current components increase in a particular manner. More specifically, the inductive component amplitude rises exponentially at the beginning of a stator current alternation (regardless of its later peak amplitude) while the resistive component amplitude is free to vary in direct proportion to rotor load of a moment. Thus, when input voltage is first applied to a motor stator, or rotor load varies while the motor is running efficiently near synchronous speed, the resistive component of stator current is the dominant variable factor which determines $I_{sic}$ characteristics. Particular $I_{sic}$ characteristics prevail when a motor is running at highest efficiency under any rated load condition. Said characteristics change when a motor is over or underpowered.

For the above reasons, an efficiency-referenced signal may be developed from $I_{sic}$ characteristics and used to command a closed-loop stator input voltage control means in proportion to subsequent changes in rotor load demand.

The energy-saving arrangement of Hedges' U.S. Pat. No. 4,297,628 relies upon the load/efficiency-related characteristics of $I_{sic}$ described above. More specifically, $I_{sic}$ characteristics are converted to corresponding characteristics of a short-duration (microseconds) pulse by conducting stator current through the primary of a transformer whose core saturates at substantially less current than flows with zero (empty shaft) load. With this arrangement, the transformer secondary produces a voltage pulse output whose duration risetime and magnitude correspond to $I_{sic}$ characteristics.

As noted earlier, $I_{sic}$ exhibits particular characteristics when a motor operates with highest efficiency. Said characteristics result from a torque-load-speed relationship between inductive and resistive components of stator current flow produced by rotor slip properties of induction motors. In response to said properties, the resistive component may be observed to increase when rotor mechanical load increases or the stator winding is underpowered, and vice-versa.

In Hedges' U.S. Pat. No. 4,297,268, $I_{sic}$ characteristics comprise "load-positive" feedback and are used as the controlling element of a closed-loop stator power control system that may be referenced by a manual adjustment to a condition of highest motor efficiency. Thus, when slip-responsive $I_{sic}$ characteristics vary, stator input power likewise varies and said reference condition of motor efficiency is maintained.

More specifically, if said closed-loop control means is initially referred to $I_{sic}$ characteristics which correspond to highest motor efficiency, it will automatically vary stator voltage magnitude in proportion to subsequent changes in the resistive (rotor load) component of stator current, when as previously noted is the dominant variable of $I_{sic}$. This load-proportional change in applied stator voltage prevents the stator winding from being over or underpowered and, therefore, the motor is caused to run with minimum input power at zero load, and operates at highest efficiency with rated loads.

It will be appreciated from the foregoing discussion that stator inrush current is related by motor slip properties to rotor speed. Therefore, $I_{sic}$ characteristics simultaneously comprise natural signal means that indicate whether the rotor is stopped, turning slowly, or running near synchronous speed. The present invention uses said speed-related $I_{sic}$ characteristics to:

1. maintain associated stator power control means in a "start-up mode" until the rotor accelerates to near-synchronous speed
2. activate AC power inhibit means if the rotor cannot accelerate to near-synchronous speed in a reasonable (preferred) time period while in said "start-up mode"
3. activate AC power inhibit means within a preferred number of power source alternations if a locked-rotor even occurs during a motor "run mode", and subsequent to motor "start-up".

Figure 1:
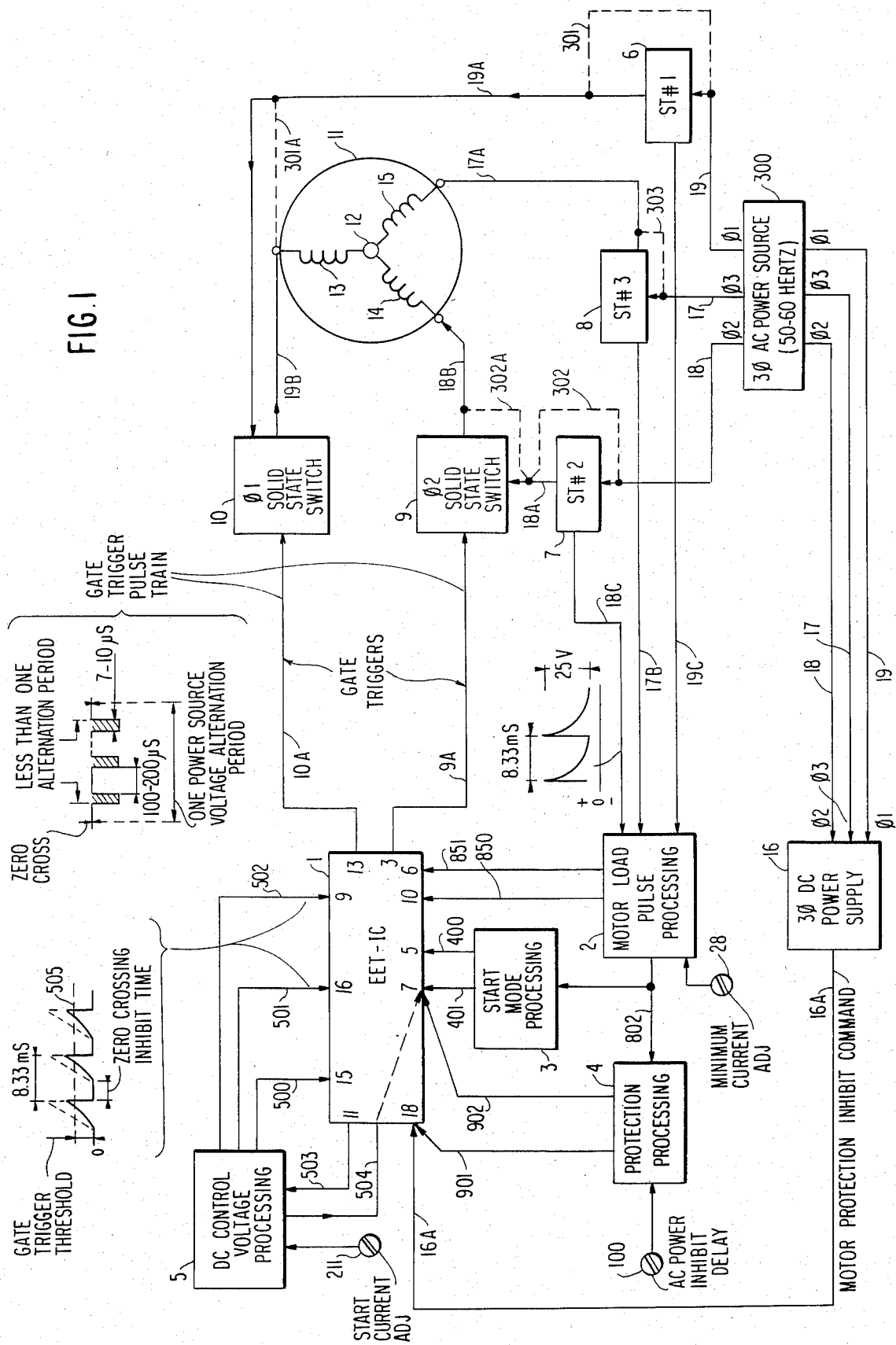
FIG. 1 is a system block diagram of the present invention.
Figure 3:
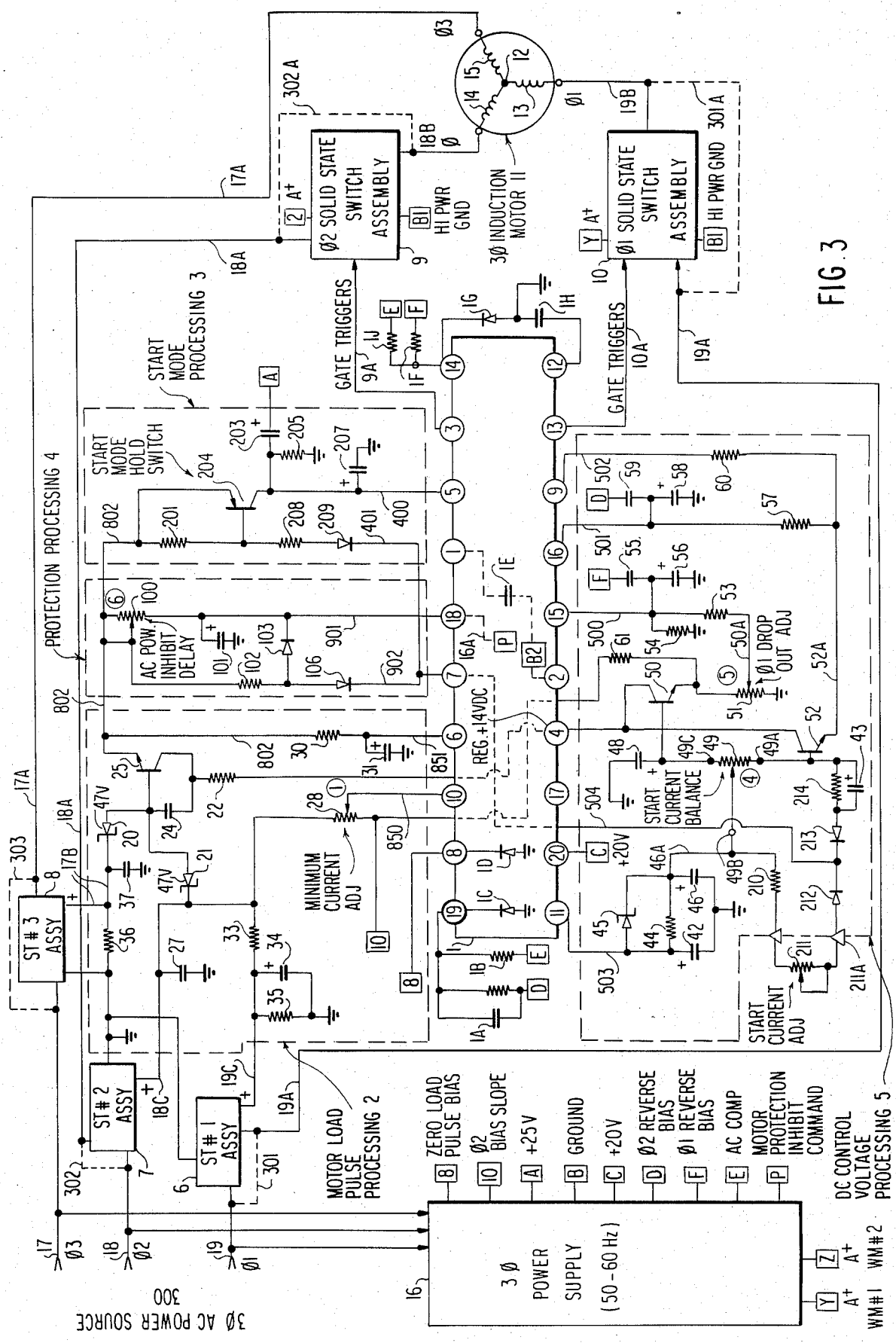
FIG. 3 is a schematic drawing of the signal processing circuits.
Figure 5:
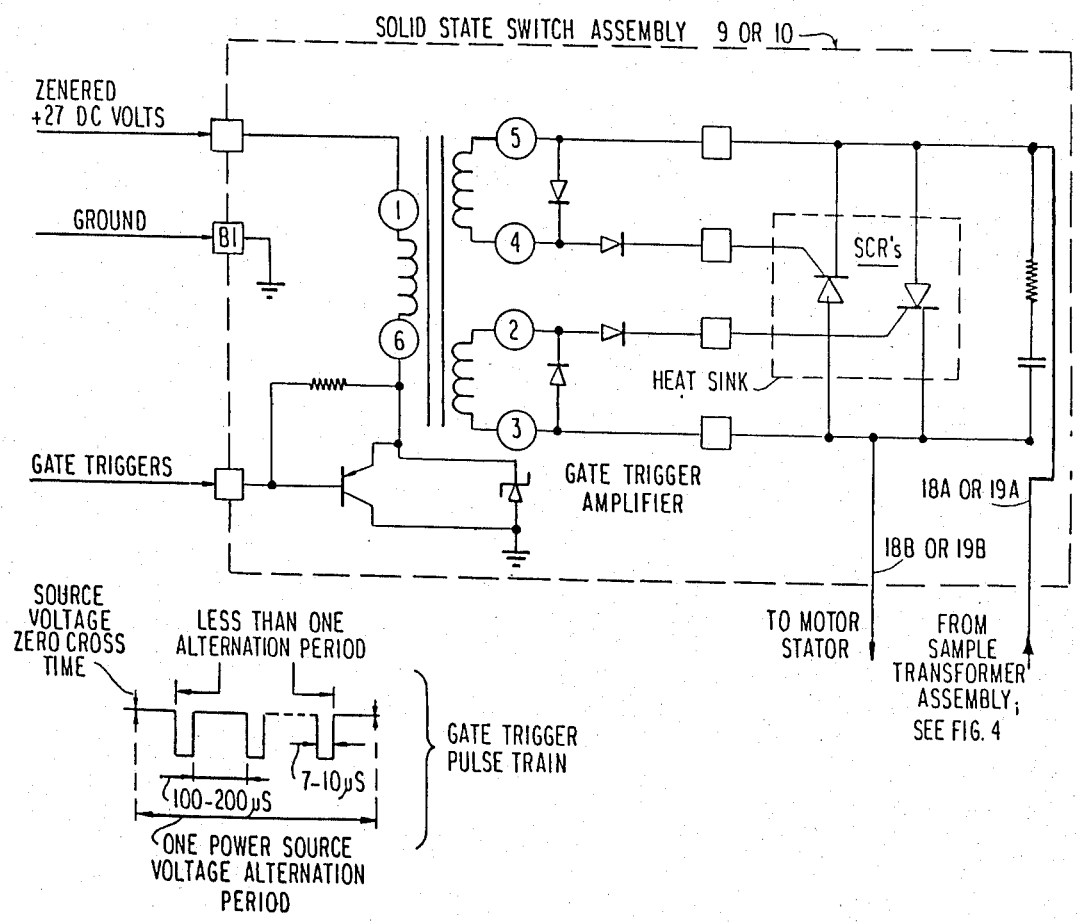
FIG. 5 is a schematic diagram of solid state switch assembly 9 or 10.

Referring to FIGS. 1 and 3, like numerals of which refer to like elements, a standard three phase AC induction motor 11 is provided with stator windings 13, 14 and 15 and a rotor having a shaft 12 adapted to be coupled to a load. A three phase AC power source 300 is normally coupled directly to stator windings 13, 14 and 15 via connections that are represented by solid lines 19 and 19A, and broken lines 301 and 301A; solid lines 18 and 18A, and broken lines 302 and 302A; and solid lines 17 and 17A, and broken line 303, respectively. In accordance with the present invention, this normal energization circuit is interrupted by removal of broken lines 301, 301A, 302, 302A, and 303, and power source 300, instead of being coupled directly to stator windings 13, 14 and 15, is connected instead as at 19, to a primary terminal of a current sample transformer assembly 6 (ST#1), the other primary terminal of which is connected via line 19A to one side of a solid state power switch assembly 10 whose other side is connected, via line 19B, to stator winding 13; as at 18, to a primary terminal of a current sample transformer assembly 7 (ST#2), the other primary terminal of which is connected via line 18A to one side of a solid state power switch assembly 9 whose other side is connected, via line 18B, to stator winding 14; and as at 17, to a primary terminal of a current sample transformer assembly 8 (ST#3), the other primary terminal of which is connected via line 17A to stator winding 15. Switch assemblies 9 and 10 may comprise, for example, Triac assemblies, or silicon controlled rectifier assemblies, with associated gate trigger amplifier and trigger coupling transformer circuitry as shown in FIG. 5. Said thyristor-type power switch assemblies are responsive to the pulse train outputs of respective wave modifier assemblies contained within the custom integrated circuit 1 (EET-IC 1). Said wave modifiers can take the form shown in Parker et al U.S. Pat. No. 4,190,793, or comprise an integrated circuit version thereof as found in EET-IC 1 of the present invention. In either case, the operation of said wave modifiers is controlled by a DC control voltage first appearing on line 46A and then on lines 500 and 501, the outputs of emitter followers 50 and 52, whose common input from line 46A may be, under one condition, a function of the load on, or the operating efficiency of, motor 11, and in another condition be determined by manual adjustment of start current ADJ potentiometer 211. As explained later, wave modifier operation may, under certain conditons, also be responsive to a DC voltage coupled to pin 6 of EET-IC 1 or inhibited until AC power is first removed then restored for motor protection reasons by momentary application of a DC voltage to pin 18 of EET-IC 1.

Figure 4:
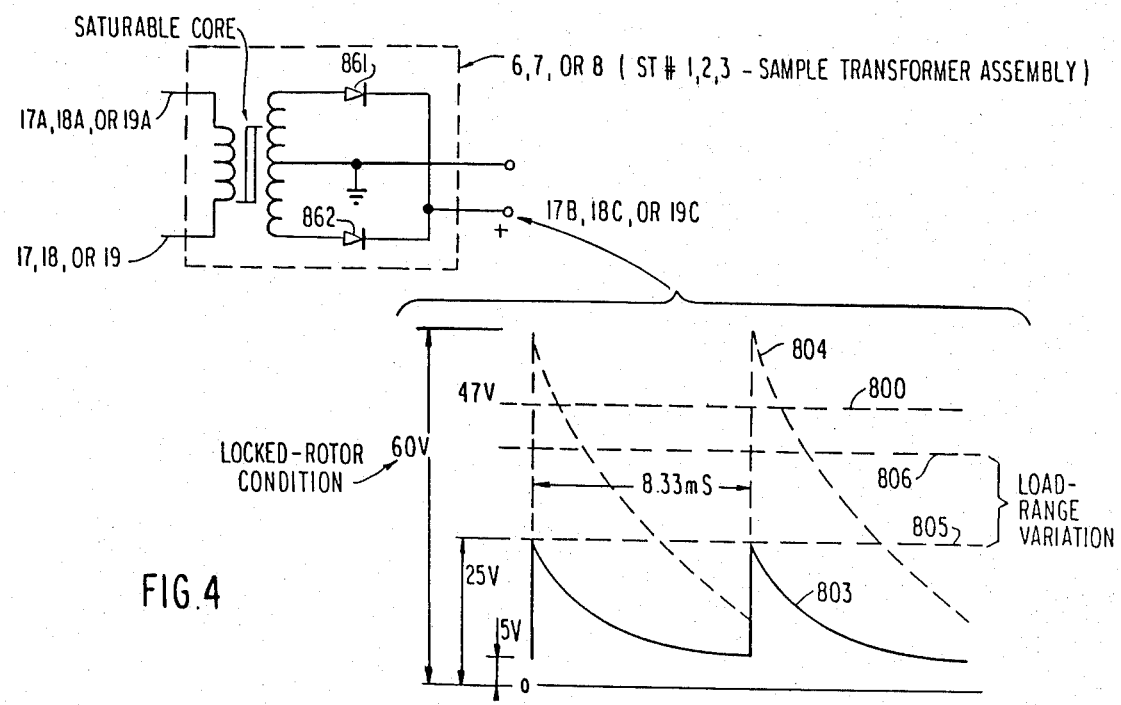
FIG. 4 illustrates typical operating waveforms developed by sample transformer assemblies 6, 7 and 8.

More particularly, and as noted above, the primaries of current sample transformer assemblies 6, 7 and 8 are connected in series with one of the stator input power lines such as 19A, 18A and 17A as shown in FIG. 4. The current sample transformer assemblies consist of a saturable core transformer with a primary winding and a center-tapped secondary winding connected to diodes 861 and 862 in a conventional full wave rectifier arrangement. A voltage pulse of relatively short duration (microseconds) derived from stator winding initial inrush current passing through said primary winding is generated across the secondary winding of said saturable core transformers each time said inrush current reverses its direction of flow (in other words, when stator current first rises from a previous zero magnitude). The output of said rectifier diodes 861, 862 therefore consists of positive pulses regardless of the actual flow direction of stator inrush current. The various individual characteristics of said voltage pulses, such as their risetime, amplitude, duration and absolute time of occurrence, vary in response to the magnitude and waveform of the applied voltage, the momentary mechanical load on the motor and inherent electromechanical properties peculiar to the motor, e.g., torque-load-speed (slip) properties.

The energy-saving aspects of the present invention when the motor is running with loads between zero and maximum rating conform to those described in Hedges' U.S. Pat. No. 4,297,628 and briefly reviewed above.

The circuits contained within the blocks identified in FIGS. 1 and 3 as motor load pulse processing 2, start mode processing 3 and DC control voltage processing 5 cooperate with the internal circuitry of EET-IC 1 and start current ADJ 211 to command a controlled-current, reduced-voltage "start-up mode" of operation when the output of AC power source 300 is first switched to the power input terminals of the present invention and, after motor 11 reaches near-synchronous speed, command a "run mode" operation thereafter. In response to signal input from motor load pulse processing 2, and in further cooperation with internal circuitry of EET-IC 1, protection processing 4 provides different "start-up mode" and "run mode" AC power inhibit (motor protection) actions. Operation of the "start-up", "run" and associated protection modes is described below with frequent reference to FIG. 1, a system block diagram of the present invention arrangement, FIG. 3, a schematic of the signal processing circuits external to EET-IC 1, and FIG. 4, which illustrates typical operating waveforms developed by sample transformer assemblies 6, 7 and 8.

Figure 2:
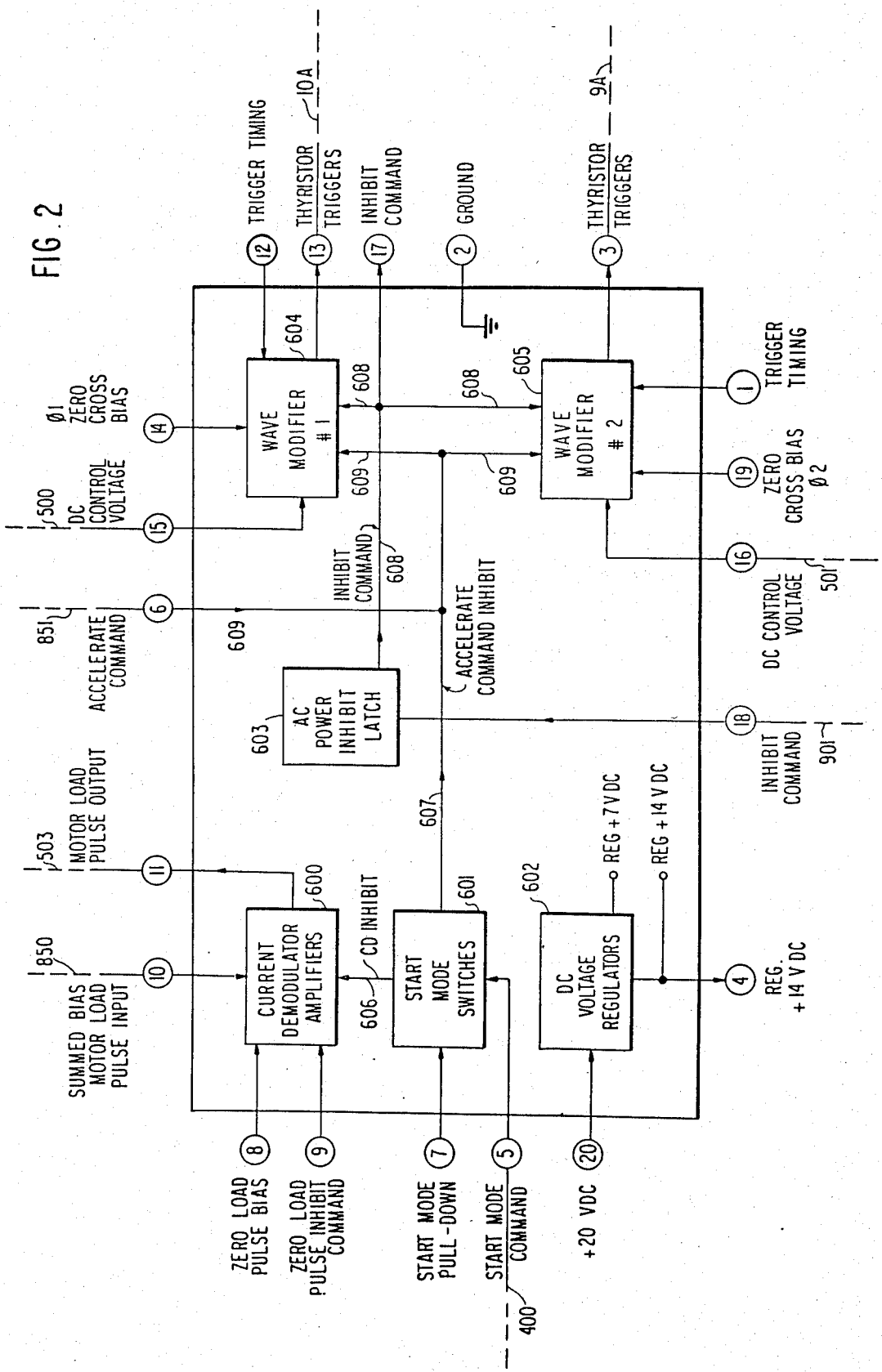
FIG. 2 is a simplified block diagram of an integrated circuit used in the present invention.

To assist understanding overall system operation of the present invention, EET-IC 1 internal operation will be summarized first. Refer to FIG. 2, a simplified block diagram of the integrated circuit EET-IC 1 which identifies its six functional elements.

Block 600, current demodulator amplifiers, converts "summed bias" inputs from ST#1, ST#2 and DC power supply 16 into a pulse of constant amplitude whose width is proportional to rotor mechanical workload when the motor runs near synchronous speed. Block 601, start mode switches, is activated by charging action through pin 5 by capacitor 203 of start mode processing 3 when AC power is first applied. Said activation (+ voltage at pin 5) causes pin 7 output of block 601 to pull low, which action inhibits block 600 via line 606 and accelerates command signal input to pin 6 via line 607. Activation of block 601 commands EET-IC 1 and associated circuitry into a "start-up mode". Block 602, DC voltage regulators, develop a regulated +7 v and +14 v. DC voltage for internal EET-IC 1 use from an external voltage coupled to pin 20 and couples +14 volts to pin 4 for use by external circuitry. Block 603, AC power inhibit latch, inhibits thyristor trigger outputs from blocks 604 and 605 (wave modifiers 1 and 2) when a + voltage (inhibit command) is applied to pin 18 and couples a + voltage output on pin 17 when commanded to the inhibit condition. The circuit of block 603 comprises a positive feedback arrangement whereby a momentary + voltage on pin 18 "latches" block 603 into an inhibit state until DC input power on pin 20 is removed. When in an inhibit state, block 603 prevents the generation of thyristor triggers and, therefore, AC power coupling by associated thyristors to motor 11 is inhibited. Blocks 604 and 605, wave modifiers 1 and 2, are identical circuits which generate thyristor-type triggers in response to + input voltage on pins 16 and 15 respectively. Generation of said triggers are further controllable by power source 300 voltage alternation bias applied to zero cross bias pins 14 and 19 via DC power supply 16 and plus voltage when/if applied to accelerate pin 6.

System operation during a start-up mode will now be examined with reference to FIGS. 1, 2, 3 and 4.

When 3∅ power from source 300 is first applied to lines 17, 18 and 19, capacitor 203 draws charging current from EET-IC 1 pin 5 as DC power supply 16 terminal "A" rises to its nominal magnitude of approximately 27 volts. This action causes start-mode switches 601 (see FIG. 2) to conduct which, in turn, causes EET-IC 1 internal lines 606 and 607 and external pin 7 to pull low, i.e., to near ground potential. Said charging action of capacitor 203 comprises a start-mode command to EET-IC 1 pin 5. Therefore, EET-IC 1 and associated circuitry assume the following seven start-mode conditions:

1. Current demodulators 600 are inhibited by line 606, which action connects EET-IC 1 pin 11 to + 14 VDC through an internal resistor.
2. Accelerate commands to wave modifiers 604 and 605 appearing at EET-IC 1 pin 6 are inhibited by line 607
3. Start-mode hold switch 204 conduction of signals on line 802 to EET-IC 1 pin 5 is enabled when its base electrode is pulled low through resistor 208, isolating diode 209, line 400 and EET-IC 1 pin 7.
4. Run-mode locked-rotor protection is inhibited when the junction of resistor 102 and isolating diode 103 is pulled low through isolating diode 106, line 902 and EET-IC 1 pin 7.
5. Start-current ADJ potentiometer 211 control is activated when its terminal 211A is pulled low through isolating diode 212, line 504 and EET-IC 1 pin 7.
6. Start-current balance potentiometer 49 is activated when its terminal 49A is provided a ground reference through resistor 214, isolating diode 213, line 504 and EET-IC 1 pin 7.
7. Capacitor 43 negative terminal is pulled low through isolating diode 213, line 504 and EET-IC 1 pin 7, and, therefore, may introduce a delay in the rise of DC control voltage supplied to the base electrode of emitter follower transistor 52 via start-current balance potentiometer terminal 49B.

To assist understanding system operation in the start-up mode, the circuit means by which solid state switch gate trigger outputs from EET-IC 1 (pins 3 and 13) are controlled will now be described. EET-IC 1 (FIG. 2) contains two identical wave modifiers, 604 and 605, each of which has five possible inputs:

1. DC control voltage via external pin #16 (15)
2. (Power source) zero cross bias via pin #14 (19)
3. An accelerate command via common line 609 from pin #6
4. An inhibit command via common line 608, and
5. Trigger timing via pin #1 (12)

FIG. 3 shows that trigger timing at pins #1 and #12 is provided by capacitors 1E and 1H respectively; said capacitors cooperate with components within wave modifiers 604 and 605 thereby to establish gate trigger pulse width and repetition frequency. The gate triggers are generated when the DC control voltage at pins #16 and #15 exceeds a particular threshold but are inhibited slightly before, during and slightly after 3∅ AC power source voltage zero crossings on line 18 and 19 by DC power supply 16 supply of appropriately phased zero cross bias to pins #14 and #19. Resistors 53, 57 and capacitors 56 and 58 in DC control voltage processing 5 cooperate with components within EET-IC 1 and said zero cross bias at pins 14 and 19 to cause the DC control voltage supplied on lines 50A and 52A to assume a sawtooth (ramp-type) waveform at lines 500 and 501, pins #16 and #15 of FIGS. 1 and 3.

Referring to the waveform illustrations at the upper left of FIG. 1, note that the time delay (after AC power source 300 zero crossings) before the DC control voltage ramp reaches the threshold (shown as dotted line 505) where gate triggers are generated decreases when DC control voltage magnitude increases, and vice-versa. It can thus be seen that the phase angle delay from voltage zero crossing at which gate trigger outputs appear at pins #3 and #13 is dependent upon the amplitude of the DC control voltage on lines 50A and 52A (of FIG. 3) and said gate trigger generation threshold 505.

During run-mode operation with a steady, or slowly increasing motor load, said DC control voltage amplitude is a load/efficiency-related function of rotor slip and said gate trigger generation threshold is fixed by the internal circuit arrangement of EET-IC 1. However, with certain load increases, a corresponding analog voltage appears at accelerate pin #6 for reasons which will be described later. It suffices here to note that below a particular magnitude, plus DC voltage applied to pin #6 serves to proportionally lower said gate trigger generation threshold (line 505 of FIG. 1), thereby to decrease the phase-angle delay in generating said triggers. Above said particular magnitude, pin #6 assumes a priority condition and said gate triggers are continuously generated (even during voltage zero crossings).

Wave modifier input, via line 608 which is common to both wave modifiers (see FIG. 2), is an internal positive voltage output of AC power inhibit latch 603 (within EET-IC 1) generated in response to an inhibit command applied to EET-IC 1 pin #18. Said positive voltage on line 608 stops wave modifiers 604 and 605 generation of gate triggers regardless of voltage inputs to pin #6 (accelerate), #15, #16 (DC control voltage) of EET-IC 1. When said wave modifiers are inhibited as described, solid state switches 9 and 10 receive no gate triggers and thus couple no AC power to stator windings 13 and 14 of motor 11.

Description of system operation of the present invention during a start-up mode now resumes with reference to FIGS. 1 and 3. Recall that charging action of capacitor 203 commanded EET-IC 1 to a "start-mode" that established seven particular circuit conditions. The "controlled-current" aspect of start-mode operation established by conditions 1, 5, 6 and 7 is described first.

Refer to FIG. 3. Start-mode condition 1 causes capacitors 42 and 46 of DC control voltage processing 5 to begin charging through EET-IC 1 pin #11 towards a maximum positive voltage subject to voltage-divider action of fixed resistor 210 and start-current ADJ (variable resistor) 211 whose terminal 211A has been referenced to ground by start condition 5. In other words, said maximum positive voltage coupled to movable arm 49B of start current balance potentiometer 49 via line 46A becomes any operator-selectable "DC control voltage" of a preferred magnitude. By virtue of potentiometer 49 (activated to provide voltage division by a ground reference of condition 6), said DC control voltage coupled from line 46A through emitter followers 50 and 52 (via associated components in their emitters) to EET-IC 1 pin 15 (wave modifier #1) and #16 (wave modifier #2) may be adjusted to cause equal start-current flow in stator windings 13 and 14. Capacitor 48 (permanently connected from the base of emitter follower 50 to ground) and 43 (connected from the base of emitter follower 52 to ground during start-mode operation by condition 7) introduce a delay in the DC control voltage rise to said operator selected value. Taken together, the charging delay of capacitors 42, 46, 43 and 48 produce a gradual increasing, i.e., a "ramp-type", DC control voltage whose rate of rise and ultimate amplitude is set by start current ADJ 211. Because of the foregoing, solid state switches 9 and 10 initially couple reduced current to stator windings 13 and 14 that gradually rises with the passage of time to a preferred maximum and the torque of motor 11, therefore, correspondingly increases in a like manner. If the operator preferred controlled-current torque maximum is sufficient to overcome inertial load-start requirements, motor 11 begins rotation and accelerates to near-synchronous speed whereat start-mode processing 3 automatically shifts EET-IC 1 into a run mode. In said run mode, said DC control voltage magnitude becomes a function of rotor load requirement.

In the event that the operator-selected start current is inadequate to accelerate motor 11 to near-synchronous speed or a locked-rotor event occurs during motor start-up, protection processing 4 will, after a manually-selected time delay, activate "AC power inhibit latch" 603 through EET-IC 1 pin #18 (FIG. 2). Immediately thereafter, solid state switches 9 and 10 cease conducting current into stator windings 13 and 14. The "dual-mode" operation of protection processing 4 will be described later. It is adequate here to note that failure of motor 11 to accelerate to near-synchronous speed in a reasonable time period due to inadequate operator start current selection—or a locked-rotor event—activates a "start-mode protection" action which terminates the previous "start-up mode".

The controlled-current aspect of the present invention "start-up mode" described above may now be summarized. Refer to FIG. 3. When AC power source 300 is first switched on, charging action of capacitor 203 of "start-mode processing" 4 commands EET-IC 1 and associated external circuitry into a particular set of conditions. Four of said conditions cooperate to produce a DC control voltage at line 46A that:

1. attains a maximum amplitude which is operator selectable by "start-current ADJ" 211,
2. rises to said maximum amplitude with a ramp-type rather than a step-function characteristic, and
3. may be factory adjusted by "start-current balance" potentiometer 49 to provide equal current flow through solid state switches 9 and 10 and stator windings 13 and 14 during the start-up mode.

Since applied stator power corresponds to said DC control voltage of line 49A, motor 11 starts with operator-selected, reduced stator voltage and current magnitude first controlled by said operator selection until motor 11 reaches near-synchronous speed, whereafter said stator current magnitude (and applied voltage) is subject to power saving load/efficiency control achieved by the practice of energy economizer technology (EET), previously described.

To assist understanding the later description of "start-mode processing" 3 and "protection processing" 4 action, their common input signal coupled by line 802 output from "motor load processing" 1 (which commands their operation) will be described first. Refer to the waveform illustrations of FIG. 4. Solid line waveform 803 is developed by stator current flow through the primary of sample transformers 6, 7 and 8 after full-wave rectification by representative diodes 861 and 862 when motor 11 is operating at zero (empty shaft) load. Voltage pulses exponential discharge between AC power source 300 alternations is a result of components connected to lines 17B, 18C and 19C which are located in motor load pulse processing 2 as shown in FIG. 3. The waveform voltages shown in FIG. 4 are representative and reflect a choice of components and design convenience, i.e., they are not inherent limitations nor intended as a specification. They were measured during operation of a model constructed in accordance with the present invention.

During typical load-range operation of motor 11, the peak amplitude of waveform 803 varies between levels 805 and 806 in accordance with the resistive component of stator current induced by rotor load of a moment. However, when rotor slip is significantly greater than when motor 11 is running efficiently, e.g., during start-up acceleration of motor 11, the peak amplitude of waveform 803 increases above level 800 in proportion to said slip increase. In the instance of a locked-rotor event, said peak amplitude rises substantially higher than during normal operation as illustrated by dotted waveform 804. In other words, the amplitude of the waveform output of sample transformers 6, 7 and 8 may be viewed as a signal means which is unfailingly generated by induction motor slip properties that inherently communicate whether motor 11 is:

1. running at a near-synchronous speed where efficient operation is possible, or
2. running at less than said efficiency-related speed, or
3. stopped, i.e., not running, but experiencing stator current flow (e.g., a "locked-rotor" condition)

Recall that at the moment input power is first applied to start an induction motor, its rotor is at rest. Therefore, until rotation actually begins, a locked-rotor condition effectively exists. During subsequent start-up acceleration, rotor slip decreases until it arrives at a load-related near-synchronous speed.

Refer now to FIG. 3. For the above reasons, the waveform peak amplitude connected by line 17B to circuitry within "motor load pulse processing" 2 at all times communicates the dynamic condition of motor 11. For example, when partial sine wave voltage is first applied to stator windings 14 and 15 via solid state switch 9, current begins flowing through sample transformer 8, sample transformer 7, and said stator windings. The resulting waveform peak amplitude on lines 17B and 18C initially communicates a locked-rotor condition. Assuming rotor acceleration begins, said peak amplitudes steadily decrease as motor 11 approaches near-synchronous speed.

Referring still to FIG. 3, note that the cathodes of 47 volt zener diodes 20 and 21 connect to line 17B and 18C respectively and their anodes are connected to the base electrode of emitter follower 25. Referring to FIG. 4, observe that the 47 volt zener conduction threshold designated as level 800 is higher than the peak amplitude variation of waveform 803 realized during typical load-range operation (levels 805 and 806) of motor 11. Thus, during routine load-range operation, zener diodes 20 and 21 couple no portion of waveform 803 to emitter follower 25. However, as previously noted, during a locked-rotor condition (e.g., the instant of motor start-up), waveform 803 peak amplitude rises substantially above the conduction threshold (level 800) of zener diodes 20 and 21. Therefore, during motor start-up, until motor 11 accelerates to a near-synchronous speed, the portion of peak amplitude above level 800 of waveform 803 is coupled to the base electrode of emitter follower 25 and, in turn, to line 802. Said portion of waveform 803 is increased from tens to hundreds of microseconds by action of capacitor 24 and becomes a control signal input to "motor load pulse procesing" 2.

Description of system operation of the present invention during a start-up mode resumes with reference to FIG. 3. Recall that when AC power is first applied, charging action of capacitor 203 couples positive voltage to pin #5 which commands EET-IC 1 to a "start-mode" that causes pin #7 to pull low (to ground) and establishes seven particular conditions. Continuation of the "start-mode processing" aspect established by condition 3, which depends upon events produced by conditions 1, 5, 6 and 7 (controlled-current aspect commands), is examined next.

Refer to FIG. 3. Recall that condition 3 was described as enabling start-mode hold switch transistor 204 emitter-collector conduction of signals on line 802 to EET-IC 1 pin #5 by connecting its base electrode to ground through resistor 208, isolating diode 209 and internal conduction of EET-IC 1 elements connected to pin #7. The circuit elements of start-mode processing 3, not yet examined, will now be discussed. Reverse bias resistor 201 connected between the base-emitter of "start-mode hold switch" transistor 204 insures turn-off of transistor 204 when EET-IC 1 is not in a start-up mode. Resistor 205 provides a discharge path for capacitor 203, connected between DC power supply terminal "A" and the junction of transistor 204's collector and EET-IC1 pin #5, and a discharge path for capacitors 207, connected between ground and the junction of transistor 204's collector and EET-IC 1 pin #5. As previously noted, when AC power is first applied, capacitor 203 couples the rising positive voltage of DC power supply terminal "A" to EET-IC 1 pin #5, which action comprises a system "start-up mode" command. Capacitor 207 performs multiple functions as follows:
1. it provides a low resistance AC filtering path for DC power supply 16 ripple or extraneous noise coupled by capacitor 203 from AC power source 300;
2. it provides integration of the rotor-slip generated signal pulses coupled from line 802 through transistor 204 during start-up mode operation, thereby providing a relatively steady DC voltage at EET-IC 1 pin 5 (which maintains EET-IC 1 in a "start-up mode"; and
3. due to conduction of transistor 204, said integration action of capacitor 207 (2 above) likewise appears on line 802 only during the start-up mode, so that capacitor 101 of protection processing 4 is charged by a DC voltage level coupled through AC power inhibit delay (variable resistor) 100 instead of short duration pulses. The significance of this will be discussed later when protection processing 4 "run-mode" operation is described.

Referring to FIG. 3, consider now the series of events that occur after AC power source 300 is first switched on to lines 17, 18 and 19:
1. EET-IC 1 and associated circuitry are commanded to particular start-mode conditions by charging action of capacitor 203; recall that one said condition enables, i.e., turns on start-mode hold switch 204, which action connects line 802 output of motor load pulse processing 2 to the common junction of capacitor 207 and EET-IC 1 pin #5.
2. DC control voltage processing 5 commands EET-IC 1 to produce solid state switch gate trigger signals as previously described, which action couples partial sine wave voltage and current, i.e., reduced starting power to motor 11.
3. The flow of AC power from source 300 through ST#3 ASSY 8, ST#2 ASSY 7, and stator windings 14 and 15 initially produces a control signal output from motor load pulse processing 2 on line 802 whose characteristics correspond initially to a locked-rotor condition (i.e., until motor 11 begins to accelerate)
4. Said pulses on line 802 are conducted by enabled transistor 204 to integrating capacitor 207 and EET-IC 1 pin #5 and provide a continuing plus DC voltage start-mode command. Therefore, the system remains in a start-mode condition even when capacitor 203 no longer draws charging current from DC power supply 16 terminal "A".
5. Until motor 11 accelerates to near-synchronous speed, signal pulses continue to appear on line 802 (for reasons previously described) and, therefore, the system remains in a "controlled-current start mode".
6. When motor 11 reaches a near-synchronous speed, the start-mode command signal pulses (generated by substantial rotor slip) cease to be coupled by motor load pulse processing 2 to line 802, i.e., no portion of waveform 803 rises above level 800, the conduction threshold of zener diodes 20 and 21.
7. Receiving no further pulses, capacitors 203 and 207 quickly discharge through resistor 205 and EET-IC 1 pin #5.
8. Therefore, the voltage at EET-IC 1 pin #5 falls below the start-command threshold level and EET-IC 1 switches to a run mode wherein:
   a. pin #7 ceases internal conduction to ground,
   b. current demodulator amplifiers 600 cease to be internally inhibited (FIG. 2), and
   c. internal accelerate command line 608 from external pin #6 ceases to be inhibited (FIG. 2).
9. Since the determination of DC control voltage magnitude on line 46A (FIG. 3) has been switched from an operator-selected reduced start power setting of start current ADJ 211 to the load/efficiency proportional output of current demodulator amplifiers 600 (EET-IC 1 pin #11) motor 11 stator input subsequently becomes a function of rotor mechanical load demand without full sine wave power being coupled from AC power source 300 (unless required by actual load demand).

The "start-mode processing" aspect of the present invention may now be summarized.

Refer to FIG. 3. Start-mode processing 4 commences operation when AC power source 300 is switched to lines 17, 18 and 19. More specifically, capacitor 203 couples the rising positive voltage of power supply 16 terminal "A" to the junction of start-mode hold switch transistor 204 collector, one lead of resistor 205 and capacitor 207 (whose other leads are grounded) and EET-IC 1 pin #5. EET-IC 1 recognizes the positive voltage coupled by capacitor 203 as a start-mode "turn-on" command and, therefore, establishes a particular set of start-mode conditions internally and externally. One said start-up condition enables (turns-on) start-mode hold switch 204. Appearance of rotor-slip produced control pulses (which result from "controlled-current" start-up of motor 11) on line 802, are coupled through start-mode hold switch 204, integrated by capacitor 207 to a continuous positive DC voltage applied by parallel connection to EET-IC 1 pin #5. When said rotor-slip pulses cease appearing on line 802, which typically signifies motor 11 has accelerated to near-synchronous speed, capacitor 207 discharges below the start-mode command threshold of EET-IC 1 pin #5. At this moment, EET-IC 1 assumes a "run mode" condition, start-mode hold switch transistor 204's base electrode ceases to be grounded through EET-IC 1 pin #7 and transistor 204 turns off, effectively disconnecting line 802 from the balance of start mode processing 3 circuitry. Thus, subsequent rotor-slip induced pulses which may briefly appear on line 802 during certain run-mode conditions are not integrated by capacitor 207 nor coupled to EET-IC 1 pin #5 and, therefore, cannot re-command EET-IC 1 to a start-up mode.

If motor start-up does not occur because of a locked-rotor condition, start-mode hold control signal pulses on line 802 will cease when EET-IC 1 wave modifiers 604, 605 are inhibited by action of protection processing 4 which is described later.

The "start-mode protection" aspect established by condition 4 in cooperation with condition 3 (start-mode processing enabling command) and conditions 1, 5, 6 and 7 (controlled-current apsect commands) is examined next.

Recall that rotor slip induced control signal pulses begin appearing on line 802, the command signal input to protection processing 4 and start-mode processing 3, shortly after AC power is switched to lines 17, 18 and 19 from AC power source 300. Recall further that capacitor 207 of start-mode processing 3 is connected to line 802 by (start-mode only) conduction of start-mode hold switch transistor 204. Thus, during "start-mode" operation, said control signal pulses are integrated by capacitor 207, and the command signal of line 802 becomes a corresponding DC voltage level. Examining the circuit of protection processing 4, note that there are two charging paths from command signal line 802 to AC power inhibit delay capacitor 101. The path from line 802 through resistor 102 and diode 103 to capacitor 101 comprises the "run-mode" AC power inhibit command path, and the path through AC power inhibit delay (variable resistor) 100 is the "start-mode" inhibit command path. Finally, recall that "start-mode" condition 4 inhibits the "run-mode" charging path to AC power inhibit delay capacitor 101 by pulling the junction of resistor 102 and the anode terminal of diode 103 to ground through diode 106, line 902 and internal conduction of internal elements of EET-IC 1 connected to pin #7. With the foregoing in mind, it can be seen that the delay of capacitor 101 in charging to the threshold level at which EET-IC 1 pin #18 activates AC power inhibit latch 603 (internal to EET-IC 1 as shown on FIG. 2) is a dual function of the rotor-slip induced signal commanded DC voltage level on line 802 and the manually selectable resistance of AC power inhibit delay resistance 100. Said inhibit command time delay may, therefore, be adjusted to allow motor 11 ample time to smoothly accelerate its typical starting load to a near-synchronous speed in an efficient manner, yet terminate the start-up mode if motor 11 does not, or cannot, start properly. For example, if operator-selected "controlled-current" provides inadequate starting torque, or a locked-rotor condition prevails when starting is attempted, or the motor-driven load mechanism jams during start-up acceleration, the charge on capacitor 101 will rise to the inhibit command threshold level and terminate start-mode operation by inhibiting gate trigger (turn-on) commands to solid-state switches 9 and 10.

In other words, the present invention "start-mode protection" arrangement may be summarized as preventing excessive input current to motor 11 otherwise resulting from:

1. failure to accelerate to a near-synchronous speed in a "reasonable" (as selected by the operator) time period, and
2. a locked-rotor condition that occurs prior to—or during—start-up acceleration.

Before description of "run-mode-protection" operation, the characteristics and processing of rotor-slip related voltage pulses that appear on line 802 under certain conditions will be re-examined and discussed. Refer to the stator current sample transformer output waveforms of FIG. 4. The amplitude and width of control signal pulses ultimately appearing on line 802 are essentially proportional to the portion of waveform 804 that rises above the zener diode 20 conduction threshold (level 800) which, in turn, is proportional to rotor-slip of the moment. In other words, a locked-rotor event that occurs when motor 11 is running causes substantially higher amplitude, wider pulses on line 802 than, for example, pulses produced if a heavy (or over) load is suddenly applied while running with energy-saving reduced voltage at zero load e.g., "clutch-coupled-load" applications.

In the instance of a locked-rotor event, for protection purposes it is desirable to remove input power from motor 11 immediately. However, if sudden application of a rated load, or moderate overload, causes a motor 11 (previously idling at reduced voltage to conserve energy) to experience excessive rotor slip, it is desirable to quickly raise applied stator voltage and re-accelerate motor 11 to a new load-related speed of optimum efficiency. In the present invention, the rotor-slip induced signal output simultaneously commands EET-IC 1 through "motor load pulse processing" 2 and "protection processing" 4 via line 802 to perform the appropriate desired action during "run-mode" operation. Refer to FIG. 3 and note that line 802 connects the control output of emitter follower 25 (whose signal input is rotor-slip induced pulses from ST#2 ASSY 7 and ST#3 ASSY 8) to EET-IC 1 "accelerate" pin #6 through resistor 30 and "AC power inhibit" pin #18 through the circuitry of protection processing 4.

The character of the control signal appearing on line 802 is caused to be different during "start" and "run" modes by cooperative action of start-mode processing 3 circuitry and internal elements in EET-IC 1. More specifically, during "start-mode" operation, integration of rotor-slip induced pulses appearing on line 802 (into a corresponding DC voltage level) was previously specified when emitter-collector conduction of start mode hold switch transistor 204 connects the ungrounded terminal of capacitor 207 to line 802. However, as also previously mentioned, transistor 204 is held nonconducting by reverse-bias resistor 201 during "run mode" operation. Thus, during "run-mode", the control signal of line 802, when present, comprises pulses during each power source current alternation whose amplitude and width are related by induction motor properties to rotor slip of the moment.

In the light of the foregoing review of the nature of the control signal when it appears on line 802 during "run-mode" operation, description of the response of motor load pulse processing 2 and protection processing 4 to said signal resumes. Assume a condition wherein motor 11 is running with an empty rotor shaft 12 (i.e., "zero load") near synchronous speed with minimum input power due to the power-saving reduction of stator voltage control action of the energy economizer, current demodulator portion of the present invention. Assume now an extreme performance demand condition wherein a moderate overload is suddenly clutch-coupled to rotor shaft 12. Because motor 11 stator voltage is substantially lower than required to deliver even five percent of full-load torque, rotor slip will begin to increase with each successive alternation of power source 300. In the first moments after said load application, increasing amplitude of the load/efficiency-related control signal input to motor load pulse processing 2 on line 18C (output of ST#2 ASSY 7) causes the current demodulator amplifiers 600 in EET-IC 1 to begin increasing the DC control voltage appearing on line 46A of DC control voltage processing 5. Therefore, phase-angle delay of gate trigger generation decreases, and motor 11 stator voltage begins rising. However, relatively long integration time constants of circuit elements between EET-IC 1 pin #11 and line 46A (necessary for optimum system stability) prevent an extremely rapid rise in DC control voltage. With the "step-function", heavy load demand assumed for discussion purposes, the rate of DC control voltage rise is inadequate and rotor slip increase continues. Thus, during the same few power source alternations, rotor-slip-induced control pulses appear at the output of emitter-follower 25 and are coupled via line 802 to a resistor 30 in motor load pulse processing 2 (and components in protection processing 4 and start-mode processing 3 whose response will be described later).

Said control pulses whose amplitude and width increases with each power source alternation as rotor slip increases are coupled through one end of resistor 30, charging capacitor 31 which is connected between ground and the junction of the other end of resistor 30 and EET-IC 1 accelerate pin #6. Recall that during the previous description of the wave modifier portions of EET-IC 1 it was noted that below a particular magnitude, plus voltage on pin #6 lowers the gate trigger generation threshold of said wave modifiers (illustrated by level 505 of FIG. 1) and decreases phase-angle delay of said trigger generation. Said action serves to accelerate the rate of increase in stator voltage coupled by solid state switches 9 and 10 to motor 11 beyond that produced by the rate of DC control voltage rise on line 46A commanded by current demodulator amplifiers 600 in EET-IC 1. In other words, with the assumed load-demand, as the DC control voltage rises on line 46A, increasing positive voltage at pin #6 (produced by the rotor-slip control pulses on line 802 charging capacitor 31) causes the gate-trigger-generation threshold to fall simultaneously, and this accelerates the rate of increase in application of stator voltage to motor 11. With a stator voltage increase, line 802 control pulse amplitude and width proportionally increase, further accelerating the rate of decrease in gate trigger phase-angle delay, i.e., increasing positive voltage at pin #6 acts as rotor-slip positive feedback. Within a few more power source alternations, motor 11 stator voltage rises sufficiently to develop the higher torque required by the new load demand. As motor 11 accelerates, rotor slip quickly decreases and said excessive-slip-generated control pulses cease appearing on line 802. Capacitor 31, therefore, discharges and EET-IC 1 current demodulator amplifiers 600 resume load-proportional control of motor 11 stator voltage.

The present invention response to an assumed extreme load demand coupled to motor 11 while running at energy-saving, reduced stator voltage may now be summarized.

First, note that while protection processing 4 circuitry also received rotor-slip-induced signals on common line 802, no inhibit command to EET-IC 1 developed. Although the assumed sudden-load condition was extreme, it was not sufficient to require protective action for motor 11. The circuit response of protection processing 4 in this instance will be fully examined when locked-rotor protection is later described. Motor load processing 2's response to the above assumed condition was twofold:

1. EET-IC 1 pin #10 (summed bias input to current demodulator amplifiers 600) was commanded to increase the DC voltage output (pin #11) in proportion to the new load demand
2. rotor-slip control pulses processed by zener diodes 20 and 21, capacitor 24, resistor 22 and emitter follower 25 were coupled via line 802 through RC time constant components connected to EET-IC 1 (accelerate) pin #6

The response of EET-IC 1 to the above described control inputs from motor load pulse processing 2 quickly raised motor 11 stator voltage to the full sine wave power required by the assumed moderate overload applied as a step-function load increase.

Run-mode protection is described below. Refer to FIG. 3. Protection processing 4 is continuously responsive to control signal pulses when they are caused to appear on line 802 by induction motor rotor-slip properties. Note there are parallel paths by which said pulses may charge AC power inhibit delay capacitor 101 to the inhibit command threshold of EET-IC 1 pin #18. The run-mode path, through resistor 102 and diode 103, is inhibited during motor 11 start-up acceleration. However, when motor 11 reaches near-synchronous speed, EET-IC 1 shifts to run-mode operation, both paths are enabled, and capacitor 101 may be charged through variable resistor 100 directly and resistor 102 through diode 103. Resistor 102 is selected to have substantially lower resistance than the maximum resistance of variable resistor 100, reducing capacitor 101 charge time during run-mode operation.

Recall that during run-mode operation, capacitor 207 (of start-mode processing 3) is not switched to line 802 by start-mode hold switch 204 and, therefore, line 802 control pulses are not integrated into a DC voltage equivalent during run-mode. For this reason, capacitor 101 is duty cycle charged during successive alternation periods wherein rotor slip induces control pulses to appear on line 802. That is, capacitor 101 charges in accordance with line 802 conditionally variable control pulse amplitude and width at the beginning of a power source current alternation period and then discharges until the next current alternation period commences. Note further that the charging time constant of resistor 22 (in the collector of emitter follower 25) and integrating capacitor 207 (activated by conduction of start-mode hold switch 204) prevents the relatively short-duration control pulses of line 802 from rising quickly, or the integrated DC voltage on line 802 to their maximum possible amplitude during start-mode operation. During run-mode, however, said control pulses are not so limited, and rise quickly and to a higher peak amplitude than in the start-mode. Note further that whereas minor variations in the slip-proportional pulse width of said control pulses are caused by said integration action of capacitor 207 to be of minor significance during start-mode protection charging of capacitor 101, during run-mode said control pulse width substantially affects its charge/discharge duty cycle and, therefore, the time-rate-of-rise to the inhibit threshold of EET-IC 1 pin #18. More specifically, a continuous succession of control pulses with the amplitude and width produced by a locked-rotor condition will, within a few alternations, charge capacitor 101 (primarily through resistor 102, diode 103) to an AC power inhibit command level, but moderately excessive rotor slip will not do so.

Consider now protection processing 4 response during the previously assumed sudden-heavy-load event. When rotor slip increased in the first moments after said load application, capacitor 101 began charging in accordance with the amplitude and width of said control pulses on line 802. Recall that although excessive rotor slip occurred momentarily, the rotor never actually stopped and, therefore, said pulses never reached locked-rotor amplitude/width proportions for even one alternation. Thus, during worst-case load-application events, protection processing 4 will not issue an AC power inhibit command.

Assume now a condition wherein motor 11, is running with an empty rotor shaft 12 and is clutch-coupled to a jammed load mechanism. In other words, assume a running motor 11 is almost instantly caused to have a locked-rotor event. In the first moments after said event, the circuit of the present invention responds as described above, i.e., it begins increasing motor 11 stator voltage to a new load demand. However, in this latter instance, rotor slip continues to increase as stator voltage rapidly increases in response to "accelerate command" action previously described. Thus, within a few alternations, the control pulses on line 802 assume the magnitude and form which corresponds to a locked-rotor condition. Within a few power source alternations after motor 11 rotor ceases rotation, capacitor 101 charges sufficiently to command EET-IC 1 pin #18 to an AC power gate trigger inhibit mode. Until DC voltage input to EET-IC 1 pin #20 is removed, then reapplied, EET-IC 1 will remain in said inhibit mode and solid state switches 9 and 10 will not couple stator voltage to motor 11.

The foregoing description of the present invention's operation during "start" and "run" modes assumed that 3∅ AC power source 300 supplied motor 11 with nameplate-rated input voltage on line 17, 18 and 19 of FIG. 1. However, during the long life of an industrial 3∅ motor, three common AC power source anomalies may cause severe, or catastrophic induction motor damage. They are:

1. AC input "phase loss", i.e., line 17, 18 or 19 becomes open-circuited in the power distribution system between AC power source 300 and motor 11,
2. the AC power source 300 voltage is substantially higher than nominal motor rating, or
3. the AC power source 300 voltage is substantially lower than nominal rating during motor start-up or during subsequent running with 75% (or higher) maximum rated load When said anomalies are short-term events, stator winding damage is unlikely. However, in instances where they occur frequently or persist for extended periods, excessive stator current flow wastes energy and often causes permanent motor damage. As described below, the present invention arrangement of 3∅ DC power supply 16 monitors characteristics of AC power line input voltage and commands EET-IC 1 to an AC power inhibit state under certain adverse conditions thereby protecting motor 11 from particular AC input power anomalies.

Figure 8:
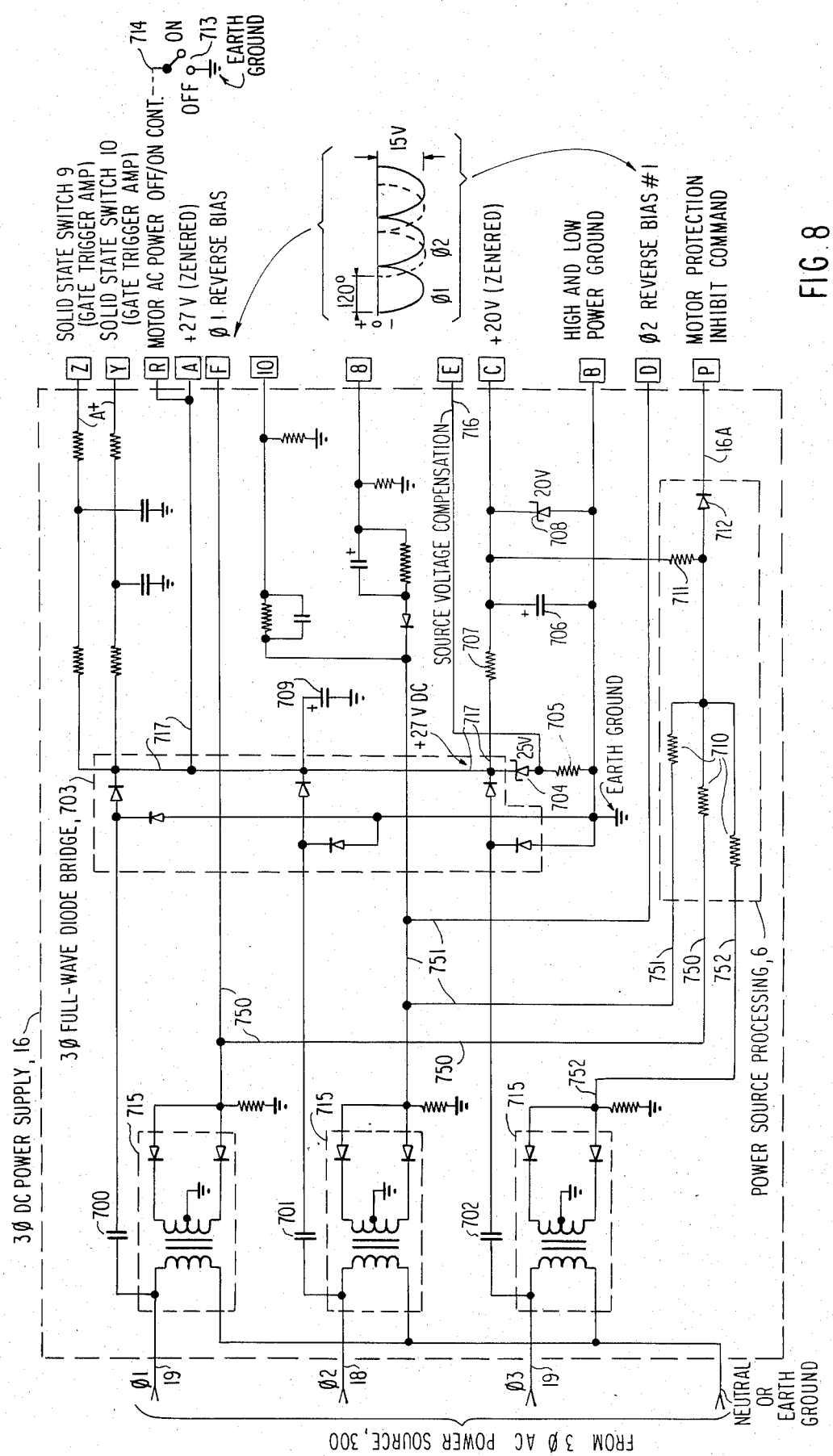
FIG. 8 is a schematic diagram of three phase DC power supply 16.

As shown in FIG. 8, 3∅ DC power supply 16 develops various system low power (e.g., 50 milliwatts) bias by transformer coupling means from the AC power source 300 input on lines 17, 18 and 19. More specifically, full-wave, unfiltered minus power source voltage alternations are developed by conventional transformer/diode rectifier assemblies 715 from lines 17, 18 and 19 and supplied as:

a. signal inputs to power source processing 6 via lines 750, 751 and 752, and
 b. appropriately phased "reverse bias" inputs to EET-IC 1 via output terminals 8 and 10 to current demodulator amplifiers 600 (FIG. 2), and via output terminals "D" and "F" to wave modifiers 604 and 605 (FIG. 2).

Said power supply 16 also develops full-wave rectified DC voltages from AC power input lines 17, 18 and 19 by capacitor coupling means which cooperates with other circuit elements to simultaneously provide:

1. regulated DC voltages for discrete and integrated circuit component operation,
2. radio frequency interference filtering (noise RFI suppression) for said input power lines,
3. a degree of capacitive power factor correction on said input power lines, and
4. low DC voltage, low current control means for on-off solid state, i.e., contactless AC power switching to a motor 11 of any horsepower (size) or input voltage rating (within the power handling capability of solid state switch technology).

More specifically, capacitors 700, 701 and 702 couple 3∅ AC voltage from said input lines to 3∅ full-wave diode bridge 703. The plus DC voltage output of bridge 703 is connected by line 717:

1. through R C decoupling networks as A+ to gate trigger amplifiers in solid state switch assemblies 9 and 10 via terminals "Z" and "Y" respectively,
2. to start-mode processing 3 via terminal "A",
3. to a first-regulator zener diode 704 cathode whose anode is grounded through a resistor 705,
4. through a resistor 707 to a second-regulator zener diode 708 cathode whose anode is grounded,
5. to a filter capacitor 709 plus terminal, whose negative terminal is grounded, and
6. to a motor AC power off/on switch 713 via terminal "R" and line 714.

The foregoing capacitively coupled arrangement satisfies DC voltage requirements of discrete and integrated circuits of the present invention and performs additional practical functions.

For example, the said arrangement simultaneously provides a low-impedance AC signal path from lines 17, 18 and 19 through capacitors 700, 701, 702, diode bridge 703 and capacitor 709 to ground. Thus, high frequency (RFI) noise generated by phase-angle delayed AC power switching of solid state switches 9 and 10 is conducted to ground, which action substantially reduces RFI radiated from lines 17, 18 and 19, or coupled thereby toward AC power source 300, i.e., along incoming AC power lines. Note further that capacitors 700, 701 and 702 are essentially connected in parallel to ground with AC input power lines 17, 18 and 19 to motor 11 which, by its nature, comprises an inductive load that lowers said input lines power factors. Said parallel-capacitor connection arrangement thus also provides a degree of power factor correction that partially offsets the inductive nature of motor 11 and becomes especially significant with fractional horsepower motors.

Finally, a terminal "R" in parallel with "A" is connected via line 717 to the plus terminal of bridge 703. As previously noted, all plus DC system operating voltages are developed by bridge 703. Therefore, if line 717 (bridge 703 positive DC output) is switched to ground, as at terminal "R" via a line 714 to one terminal of SPST switch 713 (whose other terminal is grounded), said system DC operating voltages are, in effect, turned off. In said "off" state, turn-on triggers for solid state switches 9 and 10 cannot be generated and, therefore, AC power source 300 voltage on lines 18 and 19 will not be coupled to motor 11 stator windings 13 and 14.

Thus, merely grounding line 717 (terminal "R") serves to disconnect, i.e., turn-off AC power to motor 11, or vice versa.

Additionally, grounding terminal "R" turns-off power consumption by other circuit elements fed by 3∅ diode bridge 703. However the power factor correction function of capacitors 700, 701 and 702 continues since they are now grounded through bridge 703 by direct connection via switch 713 instead of an AC ground path through capacitor 709.

In other words, the present invention arrangement use of capacitively-coupled, bridge-type rectifier assembly 703 cooperates with other invention portions to synergistically perform several useful and/or necessary (e.g. motor power on/off control and RFI suppression) functions beyond merely supplying DC operating voltages.

DC voltage regulation and AC power source 300 high voltage event compensation means of DC power supply 16 are examined and described below. Referring still to FIG. 8, note that line 717 output of bridge 703 is conducted to ground through a 25 V zener diode 704 and a resistor 705. The substantially higher than needed AC source voltage is losslessly dropped across the AC impedance of capacitors 700, 701 and 702 by conduction of various circuit components and zener diode 704. By design choice of component values, a low voltage (e.g., 2 volts) may be developed across resistor 705 by conduction of zener diode 704 when AC power source 300 supplies nominally rated voltage. When said AC voltage varies, said low voltage will proportionally vary. Therefore, said low voltage may be coupled via line 716 through terminal E to the wave modifier portions of EET-IC 1 as AC power line voltage magnitude responsive bias. Thus, when AC power source voltage rises, and the unregulated reverse bias output of transformer assemblies 715 rises, the positive bias voltage output of terminal E likewise rises, which action offsets said negative bias increase to EET-IC 1, and vice versa. Said bias compensation improves energy-saving during "start" and "run" mode operation by the present invention under conditions of AC input voltages substantially higher than the rated voltage of motor 11.

AC power source 300 monitoring by, and motor protection action of, a power source processing 6 of 3∅ DC power supply 16 is now described with reference to FIG. 8. Reverse bias outputs of transformer assemblies 715 provide signal inputs to power source processing 6 via lines 750, 751 and 752 to one end of identical resistors 710 whose other ends are common and connected via pull-up resistor 711 to the cathode of zener voltage regulating diode 708 and further coupled through isolating diode 712 and terminal "P" to EET-IC 1 AC power inhibit pin #18. By choice of component values, said common connection point may be caused to assume a particular negative value when all three phases of AC power source 300 supply 65% or more of rated (nominal) input voltage to lines 17, 18 and 19. If said AC power source voltage falls below said 65% value, the common junction of resistors 710, 711 and diode 712 will be raised to a positive voltage level by pull-up resistor 711. Diode 712, being positively biased under this condition, conducts said junction positive voltage to EET-IC 1 pin #18, which action comprises an AC power inhibit command to EET-IC 1. Thus, in the event AC power source 300 voltage falls below 65% of nominal, a condition whereunder motor 11 would be seriously underpowered and subject to starting difficulties or overheating with moderate or higher rated loads, power source processing 6 issues an AC power inhibit command (positive voltages) to EET-IC 1. Solid state switches 9 and 10, receiving no further turn-on triggers from EET-IC 1, cease coupling said low input voltage from AC power source 300 to motor 11 stator windings 13 and 14.

Consider now a phase-loss condition on any one of input power lines 17, 18 or 19. When all phases are present, the common junction of resistors 710 realizes continuous negative DC voltage. However, loss of any input phase results in a "single phase" condition between the remaining two powered lines. Under said single phase AC power input condition, the common junction of resistors 710 realizes a single-phase, full-wave rectified waveform. That is, negative half sine wave alternations which rise to zero rather than the previous continuous negative DC voltage produced by 3∅ input power. Thus, as said first single phase negative alternation rises toward zero, pull-up resistor 711 causes the common junction of resistors 710, 711 and diode 712 to rise to a positive voltage. As in the case of low AC input voltage described above, said junction positive voltage comprises an AC power inhibit command to EET-IC 1 pin #18 and AC power ceases to be coupled to motor 11 stator windings 13 and 14 by solid state switches 9 and 10.

The present invention's unique energy-saving and motor protection operation during "start" and "run" modes is summarized below under the following motor 11 conditions:

1. Start-up and subsequent running that does not require protective action
2. One AC power input phase is missing, i.e., phase loss at start-up or during subsequent running
3. A mechanical locked-rotor state exists, or occurs, when motor start-up is attempted
4. A locked-rotor event which occurs during run-mode, i.e., subsequent to normal start-up
5. Excessively low (65% or less) AC power source 300 voltage 6. Excessively high (125% or more) AC power source 300 voltage The following applies to conditions #1, #2, #3, #5 and #6 above. At the first instant when AC power source 300 is energized, FIG. 1 shows that:

a. Line 17 couples ∅3 (if present) from AC power source 300 to DC power supply 16 and, through ST#3 ASSY 8, via line 17A to stator winding 15 of motor 11, b. Line 18 couples ∅2 (if present) from AC power source 300 to DC power supply 16 and, through ST#2 ASSY 7, via line 18A to the input of ∅2 solid state switch assembly 9 whose output connects to stator winding 14 of motor 11 via line 18B, and c. Line 19 couples ∅1 (if present) from AC power source 300 to DC power supply 16 and, through ST#1 ASSY 7, via line 19A to the input of ∅1 solid state switch assembly 10 whose output connects to stator winding 31 of motor 11 via line 19B At said first instant, and for a few AC power source alternations thereafter, no current flows in motor 11 stator windings since solid state switches 9 and 10 are in an off-state, and turn-on gate triggers are not yet being generated by EET-IC 1.

At this moment after power turn-on, assume condition #1 above and refer to FIG. 3. System reverse bias is instantly coupled from DC power supply 16 via terminals 8, 10, "F" and "D" to EET-EC 1 and rising plus DC voltages via terminals "A", "C" and "E". The rising voltage at DC power supply 16 terminal "A" comprises a system start-up signal, and, therefore, EET-IC 1 commands internal circuitry, start-mode processing 3, protection processing 4 and DC control voltage processing 5 external circuitry into a particular set of conditions which cooperatively establish what hereinafter is termed start-mode operation. Briefly stated, said conditions:

a. activate start-mode processing 3 thereby to hold EET-IC 1 in said start-mode operation until motor 11 accelerates to near-synchronous speed, b. enable AC power inhibit start-up delay action of protection processing 4, and c. transfer stator winding current control by solid state switches 9 and 10 from the load/efficiency responsive (current demodulators) portion of EET-IC 1 to start-mode manual control via start current ADJ 211 (a variable resistor)

Item c above enables operator manual selection of start-mode maximum torque developed in motor 11 by controlled-current limiting of stator current. Assuming said selected start-up torque is adequate for motor 11 start-up load demand, rotor acceleration commences without the excessive current surge that occurs with full power line voltage starting or the greater than necessary current surges commonly realized with various prior art reduced-voltage motor start means. If the operator-preferred start-up torque selection is inadequate to meet the actual demand, i.e., acceleration to near-synchronous speed within the operator-selected AC power inhibit delay time period does not transpire, protection processing 4 commands EET-IC 1 to inhibit turn-on of solid state switches 9 and 10 and, therefore, prevents stator current flow in motor 11 until AC power source 300 is switched off, then on again. Operator determination of an unknown load start-up demand is thus easily determined without measurement instruments by merely incrementally advancing start current ADJ control 211 until motor start-up occurs within the operator-selected acceleration time when AC power source 300 is switched on.

When thus adjusted, motor 11 rotation will start slowly as rotor torque gradually increases, then smoothly accelerate to near-synchronous speed with near-minimum power consumption in a time period determined by rotor load demand and motor 11's natural characteristics. At said speed, start-mode processing 3 will transfer system control by EET-IC 1 to run-mode operation. In said run-mode, reduced-stator voltage magnitude coupled by solid state switches 9 and 10 to motor 11 stator windings is caused to subsequently be proportional to load-demand in response to the load-pulse current demodulator portion of EET-IC 1. Thus, full power line voltage is never applied to motor 11 during controlled-current start-up, nor even at the end of start-mode operation unless actually required by rotor load demand.

Assume now an AC input power line 17, 18 or 19 is open-circuited (condition #2 above) before motor 11 start-up is attempted, or occurs later during run-mode operation. Said condition is referred to as "phase loss". Under said condition, power source processing 6 of 3∅ DC power supply 16 (FIG. 8) commands EET-IC 1 within one cycle of AC power source 300 to inhibit turn-on of solid state switches 9 and 10. Thus, if motor 11 start-up is attempted under said condition, EET-IC 1 switches to an AC power inhibit state before start-mode operation can be established, thereby preventing locked-rotor start-up current flow in any stator winding. If phase loss occurs when the present invention is in the run-mode, stator current flow in the remaining two power windings is terminated within one current alternation of AC power source 300. In other words, the present invention provides input phase loss protection to motor 11 in one cycle, or less, of AC power source 300 under any operating condition.

Assume now a locked-rotor state exists when motor 11 start-up is attempted (condition #3 above). In response to stator-current-sample control pulse characteristics which correspond to higher than full-load magnitude, protection processing 4 start-mode operation commands EET-IC 1 to an AC power inhibit state at the conclusion of an operator-selected start-up time delay period since motor 11 could not accelerate to near-synchronous speed. If, however, the controlled-current flow selected by the operator is less than full-load rating, motor 11 although not running will not be damaged and EET-IC 1 will not be commanded to an AC power inhibit state. In other words, motor 11 is protected from prolonged high magnitudes of normal reduced-voltage start-up current or locked-rotor condition excessive current magnitudes that occur during start-mode operation.

Assume now a locked-rotor event occurs during otherwise routine running of motor 11 (condition #4 above). In response to stator-current-sample control pulse characteristics which correspond only to a locked-rotor condition when rapidly increasing AC voltage is coupled to motor 11 stator windings, protection processing 4 run-mode operation (which is not operator-adjustable) commands EET-IC 1 to an AC power inhibit state within a full power source alternations after rotor rotation ceases.

Assume now that AC power source 300 voltage is substantially lower than motor 11 rated (nameplate specified) input voltage (condition #5 above). Below about 65% of power source nominal voltage rating, power source processing 6 of 3∅ power supply 16 (FIG. 8) will command EET-IC 1 to an AC power inhibit state, preventing motor 11 start-up or continued run mode operation. However, if motor 11 is running at near-maximum rated load and power source 300 decreases substantially (causing motor 11 to stall into a locked-rotor condition), protection processing 4 or power source processing 6 will command EET-IC 1 to an AC power inhibit state before AC power source 300 voltage falls to (or below) 65% of nominal rating.

Assume now that AC power source 300 voltage is substantially higher than motor 11 rated (nameplate specified) input voltage (condition #6 above). Assume further that the breakdown voltage rating of solid state switches 9 and 10 is not a performance limiting factor, i.e., said assemblies will operate normally with the higher than nominal voltage of AC power source 300 assumed for discussion purposes.

The present invention will provide the above described energy-saving, motor protection functions in start and run mode operation with AC power source 300 over-voltage magnitude of approximately twenty percent (i.e., 120% of nominal). However, as the over-voltage condition rises above about twenty percent, the high-voltage bias compensation circuitry of 3∅ DC power supply 16 becomes less effective and the rotor-slip-induced control signal pulse amplitude coupled by motor load pulse processing 2 to protection processing 4 begins to increase with AC power source 300 voltage increase, i.e., said control pulse characteristic becomes source voltage responsive (instead of only "manual selection" responsive in "start" mode and "load-controlled" responsive in "run" mode). More specifically, in both start and run mode operation, said source voltage response by said control pulse amplitude decreases the AC power inhibit delay of protection processing 4. Thus, at some percent increased magnitude of AC power source voltage 300 (above 120% of nominal), protection processing 4 will command EET-IC 1 to an inhibit state during an attempt to start motor 11, i.e., start mode operation will be terminated during motor 11 acceleration time. In other words, solid state switches 9 and 10 are inhibited during start mode if AC power source 300 supplies substantially higher (i.e., typically in excess of 125%) than nameplate-rated voltage, thereby protecting motor 11 from potentially damaging stator current magnitudes during start-up.

Protection processing 4 AC power inhibit action likewise occurs under certain circumstances if AC power source 300 voltage rises above about twenty percent of nominal rating subsequent to motor start-up, i.e., when the present invention is in run mode operation. Recall it was previously noted that rotor-slip-induced control pulse amplitude increases with substantial power source voltage increase. Therefore, as in the instance of start mode operation described above, protection processing 4 AC power inhibit action becomes controllingly responsive to excessive source voltage amplitude as well as load demand, and especially with sudden increases in load demand. More particularly, at some magnitude above 120% of nominal power source voltage, said control pulse amplitude will rise sufficiently to cause protection processing 4 to command EET-IC 1 to an inhibit state, thereby inhibiting solid state switches 9 and 10 conduction, which action terminates current flow into motor 11 stator windings. Sudden load increases from very light load to heavy (or over) load demand will cause protection processing 4 inhibit command action at lower over-voltage magnitudes than, for example, run mode operation with a steady load.

Summarizing system performance with higher-than-rated AC power source 300 voltage, controlled-current (reduced-voltage) start and subsequent energy-saving run mode operation continue until said source voltage increase exceeds about 120% of nominal. At a particular voltage above this magnitude, subject to dynamic conditions of the moment, AC power coupling to motor 11 stator windings by solid state switches 9 and 10 is inhibited by command of protection processing 4.

While I have described a particular embodiment of an operational model constructed in accordance with the present invention, many variations in implementation will be apparent to those skilled in the aft. For example, whereas the arrangement described herein relies almost entirely upon analog circuit and signal pulse processing means, the equivalent of nearly all said analog means can be achieved with microprocessor technology implemented by associated hardware and software means that rely upon the concepts of the present invention. By way of specific example, the operator-selectable AC power inhibit delay period of protection processing 4 in start mode operation developed by using signal pulses to charge a capacitor to a particular voltage threshold through a manually variable resistor 100 may be accomplished by digitally counting said pulses and manually programming, i.e., selecting the particular pulse count at which an AC power inhibit action occurs.

It must be understood, therefore, that the foregoing description is intended to be illustrative only and not limitative of the present invention, and all such variations and modifications as are in accordance with the principles described are meant to fall within the scope of the appended claims.

I claim:

1. A power control system comprising an AC induction motor having a rotor and a stator winding, a sine wave power supply for energizing said stator winding to effect rotation of the rotor, a motor current demodulator coupled to the stator winding for monitoring operating efficiency-related parameters of the inrush current to the stator winding each time the current in the stator winding increases from zero, the motor current demodulator including a sample transformer operative to generate a voltage pulse output control signal whose characteristics are at least in part dependent upon the efficiency-related inrush current parameters, the motor current demodulator also including a control circuit responsive to said voltage pulse output control signal for controlling the energization which is supplied by said power supply to the stator winding by varying the portion of each sine wave which is coupled to the stator winding from the power supply, manually settable means for selecting a maximum value of motor starting torque during a start mode of operation, said manually settable means being rendered operative in response to said voltage pulse output control signal, means responsive to said voltage pulse output control signal for deactivating said control circuit during said start mode, means controlled by said manually settable means for limiting the maximum current which is supplied to said stator winding from said power supply during said start mode to assure that the motor torque does not exceed said selected maximum value of motor torque during said start mode, and means responsive to said voltage pulse output control signal as the motor speed reaches near synchronous speed for rendering said control circuit operative thereby to switch said power control system from said start mode into a run mode.

2. The power control system of claim 1 wherein said induction motor is a three phase motor having three stator windings, said power supply being a three phase power source whose three phases are connected respectively to said three stator windings, the connection between each of said power supply phases and its respective stator winding including a respective said motor current demodulator and a respective said control circuit.

3. The power control system of claim 1 including means responsive to characteristics of said voltage pulse output control signal indicative of occurrence of a locked rotor condition during said start mode for inhibiting the supply of current from said power supply to said stator winding.

4. The power control system of claim 1 including means responsive to characteristics of said voltage pulse output control signal indicative of occurrence of a locked rotor condition during said run mode for inhibiting the supply of current from said power supply to said stator winding.

5. The power control system of claim 1 including means responsive to characteristics of said voltage pulse output control signal for detecting failure of said motor to accelerate to near synchronous speed within a particular time interval during said start mode for inhibiting the supply of current from said power supply to said stator winding.

6. The power control system of claim 2 including means capacitively coupling each of said power supply phases to a three phase full wave diode bridge operative to produce a DC operating potential for use by said control circuit, and means capacitively coupling the output of said bridge to ground.

7. The power control system of claim 1 including means responsive to characteristics of said voltage plus output control signal for determining whether the magnitude of the output potential of said power supply has increased above a predetermined limit and for inhibiting the energization of said stator winding by said power supply when such increase has occurred.

8. The control system of claim 5 including manually adjustable means for selectively varying said time interval.

9. The control system of claim 1 wherein said motor is a three phase induction motor, said power supply being a three phase power supply whose phases are connected respectively to stator windings in said motor.

10. The control system of claim 9 including means responsive to occurrence of an open circuit condition in at least one of the phases of said power supply for inhibiting energization of said motor stator winding from said power supply.

* * * * *